US012179496B2

(12) United States Patent
Profaca

(10) Patent No.: US 12,179,496 B2
(45) Date of Patent: Dec. 31, 2024

(54) THREAD-COATING MODULE WITH INK MANAGEMENT SYSTEM

(71) Applicant: Memjet Technology Limited, Dublin (IE)

(72) Inventor: Mark Profaca, North Ryde (AU)

(73) Assignee: Memjet Technology Limited (IE)

( * ) Notice: Subject to any disclaimer, the term of this patent is extended or adjusted under 35 U.S.C. 154(b) by 365 days.

(21) Appl. No.: 17/815,686

(22) Filed: Jul. 28, 2022

(65) Prior Publication Data

US 2023/0031625 A1 Feb. 2, 2023

Related U.S. Application Data

(60) Provisional application No. 63/227,239, filed on Jul. 29, 2021.

(51) Int. Cl.

| | |
|---|---|
| ***D06B 11/00*** | (2006.01) |
| ***B05C 5/02*** | (2006.01) |
| ***B05C 11/10*** | (2006.01) |
| ***B05C 13/02*** | (2006.01) |
| ***B05C 15/00*** | (2006.01) |
| ***B41J 2/15*** | (2006.01) |
| ***B41J 2/185*** | (2006.01) |
| ***B41J 3/407*** | (2006.01) |
| ***B41J 3/60*** | (2006.01) |
| ***D06B 23/02*** | (2006.01) |
| ***D06B 23/30*** | (2006.01) |
| ***D06P 5/30*** | (2006.01) |

(52) U.S. Cl.

CPC ............. *B41J 2/185* (2013.01); *B05C 5/0241* (2013.01); *B05C 5/027* (2013.01); *B05C 11/1039* (2013.01); *B05C 13/02* (2013.01); *B05C 15/00* (2013.01); *B41J 2/15* (2013.01); *B41J 3/4078* (2013.01); *B41J 3/60* (2013.01); *D06B 11/0023* (2013.01); *D06B 23/023* (2013.01); *D06B 23/30* (2013.01); *D06P 5/30* (2013.01); *B41J 2002/1853* (2013.01)

(58) Field of Classification Search

None

See application file for complete search history.

(56) References Cited

U.S. PATENT DOCUMENTS

| | | | | |
|---|---|---|---|---|
| 6,059,391 | A * | 5/2000 | Fulkerson | B41J 11/06 68/205 R |
| 2014/0082859 | A1* | 3/2014 | Morton | D06P 7/005 8/483 |
| 2018/0147591 | A1* | 5/2018 | Krumma | B05B 13/0431 |
| 2022/0074098 | A1* | 3/2022 | Yamashita | B41J 11/00216 |

* cited by examiner

*Primary Examiner* — Cristi J Tate-Sims

(74) *Attorney, Agent, or Firm* — Cooley LLP

(57) ABSTRACT

A thread-coating module includes: a coating chamber having a thread entrance at one end and a thread exit at an opposite end thereof; and an inkjet printhead positioned in a printhead opening of the coating chamber for ejecting ink onto thread fed through the coating chamber. The coating chamber has an ink management system positioned opposite the printhead for managing excess ink. The ink management system includes: an inner ink-collection slot in fluid communication with a drain port for recycling excess ink and an outer aerosol-collection chamber fluidically connected to a vacuum port.

13 Claims, 4 Drawing Sheets

THREAD-COATING MODULE WITH INK MANAGEMENT SYSTEM

CROSS REFERENCE TO RELATED APPLICATIONS

This application claims priority to and the benefit of U.S. Provisional Patent Application No. 63/227,239, filed on Jul. 29, 2021, the disclosure of which is incorporated herein by reference in its entirety for all purposes.

FIELD OF THE INVENTION

This invention relates to a system for coating ink onto threads. It has been developed primarily for enabling pagewide inkjet printing technology to produce colored threads.

BACKGROUND OF THE INVENTION

Inkjet printers employing Memjet® technology are commercially available for a number of different printing formats, including desktop printers, digital inkjet presses and wideformat printers. Memjet® printers typically comprise one or more stationary inkjet printhead cartridges, which are user replaceable. For example, a desktop label printer comprises a single user-replaceable multi-colored printhead cartridge, a high-speed label printer comprises a plurality of user-replaceable monochrome printhead cartridges aligned along a media feed direction, and a wideformat printer comprises a plurality of user-replaceable printhead cartridges in a staggered overlapping arrangement so as to span across a wideformat pagewidth.

U.S. Pat. No. 10,144,232, the contents of which are incorporated herein by reference, describes a scalable, modular pagewide printing system in which multiple print modules can be arranged in a N×M two-dimensional array. Providing OEM customers with the flexibility to select the dimensions and number of printheads in an N×M array in a modular, cost-effective kit form enables access to a wider range of commercial digital printing markets that are traditionally served by offset or other printing systems.

US 2021/0252548, the contents of which are incorporated herein by reference, describes systems and methods for coating ink onto threads using pagewide inkjet printing technology.

It would be desirable to provide improved or alternative systems for coating ink onto threads using pagewide inkjet printing technology.

SUMMARY OF THE INVENTION

In a first aspect, there is provided a thread-coating module comprising:

- a base plate having a printhead opening;
- an inkjet printhead received in the printhead opening; and
- a chamber unit having a mouth for engagement with the base plate and an ink-collection slot opposing the printhead, wherein the chamber unit and the base plate are movable relative to each other for opening and closing a coating chamber comprising the base plate and the chamber unit, the ink-collection slot being positioned opposite the printhead in the coating chamber.

Preferably, the base plate is fixedly mounted on a support structure and the chamber unit is slidably movable towards and away from the base plate.

Preferably, the coating chamber defines a thread entrance at one end and thread exit at an opposite end thereof.

Preferably, the printhead is fast with a pivot plate, the pivot plate being pivotally movable relative to the base plate about a pivot axis perpendicular to a plane of the base plate for adjusting an angle of the printhead relative to the base plate.

Preferably, at least part of the pivot plate is received in the printhead opening of the base plate.

Preferably, the thread-coating module further comprises a print module supporting the inkjet printhead, wherein the print module has a chassis fastened to the pivot plate.

Preferably, the print module comprises a maintenance module for maintaining the printhead, the maintenance module comprising a capper and/or a wiper.

Preferably, the print module comprises a printhead movement mechanism for moving the printhead between a maintenance position and a coating position, the printhead being extended towards the coating chamber in the coating position and retracted towards the maintenance module in the maintenance position.

Preferably, the capper and/or wiper are movable relative to the printhead in the maintenance position.

Preferably, the chamber unit has a vacuum opening for collecting ink aerosol.

Preferably, the ink collection-slot is fluidically connected to a drain port for receiving collected ink.

In a related aspect, there is provided a thread-coating system comprising at least first and second thread-coating modules as described hereinabove, the thread-coating modules being arranged in series and mounted on a common support structure, wherein the first and second thread-coating modules are oppositely oriented with respect to a thread fed therethrough for ejecting ink towards the thread from opposite sides thereof.

In a second aspect, there is provided a thread-coating system comprising:

- a thread-coating module having a droplet ejector assembly;
- a thread gatherer positioned upstream of the thread-coating module, the thread gatherer being configured for receiving a plurality of threads from a plurality of first spindles and arranging the plurality of threads in a thread wall for feeding through the thread-coating module, the thread wall comprising a plurality of threads stacked in a direction perpendicular to a direction of droplet ejection; and
- a thread expander positioned downstream of the thread-coating module for receiving a coated thread wall and expanding the coated thread wall into individual threads for winding onto a plurality of second spindles, wherein the thread gatherer comprises:

- a pivotable thread plate having a plane parallel to the thread wall and a pivot axis perpendicular to the thread wall;
- a plurality of primary rollers rotatably mounted on the thread plate, the primary rollers being positioned in a first line extending towards the thread-coating module, each primary roller receiving a respective thread from a respective first spindle and having an axis of rotation perpendicular to the thread wall, whereby pivoting of the thread plate changes an angle of the first line and thereby changes a spacing of threads in the thread wall and an overall height of the thread wall.

Preferably, the thread-coating module comprises a coating chamber and a digital inkjet printhead positioned for ejecting ink droplets onto the thread wall.

Preferably, the inkjet printhead comprises nozzle rows extending generally along a thread-feed direction.

Preferably, an angle between the nozzles rows and the thread-feed direction is between 0 and 10 degrees.

Preferably, the inkjet printhead is pivotable relative to the thread-feed direction, wherein a pivot axis of the inkjet printhead is perpendicular to the thread wall.

Preferably, the inkjet printhead is fast with a pivot plate, the pivot plate being pivotally movable relative to a sidewall of the coating chamber.

Preferably, thread-coating module further comprises a print module supporting the inkjet printhead, wherein the print module has a chassis fastened to the pivot plate.

Preferably, the thread plate comprises a plurality of secondary rollers corresponding to the primary rollers, each secondary roller receiving a respective thread from a first spindle and feeding the thread to a corresponding primary roller.

Preferably, the secondary rollers are positioned at different distances from the primary rollers.

Preferably, the secondary rollers are arranged in a second line, the second line being angled relative to the first line.

Preferably, the thread expander mirrors the thread gatherer.

In a third aspect, there is provided a thread-coating module comprising:

- a coating chamber having a thread entrance at one end and a thread exit at an opposite end thereof; and
- an inkjet printhead positioned in a printhead opening of the coating chamber for ejecting ink onto thread fed through the coating chamber, wherein the coating chamber comprises an ink management system positioned opposite the printhead for managing excess ink, the ink management system comprising:

- an inner ink-collection slot in fluid communication with a drain port for recycling excess ink; and
- an outer aerosol-collection chamber fluidically connected to a vacuum port.

Preferably, the aerosol-collection chamber surrounds the ink-collection slot.

Preferably, the aerosol-collection chamber is in fluid communication with the drain port.

Preferably, the vacuum port is defined in a roof of the coating chamber.

Preferably, the drain port is defined in a floor of the coating chamber.

Preferably, the ink-collection slot has a lower drain aperture defined in a base thereof.

Preferably, the drain port is positioned for receiving ink from the drain aperture under gravity.

Preferably, inner walls of the ink-collection slot are configured for directing captured ink towards the drain aperture.

Preferably, the ink-collection slot comprises one or more ink-collection channels tapered towards the drain aperture.

Preferably, the ink-collection slot is configured an open chamber substantially coextensive with the printhead.

It will of course be appreciated that features described above in relation to the first, second and third aspects may be applicable to any of the first, second and third aspects, as appropriate.

As used herein, the term “ink” is taken to mean any printing fluid, which may be printed from an inkjet printhead. Usually, the ink contains a colorant. However, the term “ink” may include conventional dye-based or pigment based inks, infrared inks, fixatives (e.g. pre-coats and finishers), functional fluids (e.g. solar inks) and the like.

As used herein, the term “pagewide printhead” refers to a printhead comprised of multiple printhead chips and typically having a length of at least 100 mm, at least 150 mm or at least 200 mm. The printhead chips may be butted together in a row or alternately staggered in an overlapping array along a length of the printhead. Pagewide printhead technology will be well known to the person skilled in the art and is synonymous with “linehead” printhead technology and “single-pass” printing technology.

BRIEF DESCRIPTION OF THE DRAWINGS

Embodiments of the present invention will now be described by way of example only with reference to the accompanying drawings, in which.

DETAILED DESCRIPTION OF THE INVENTION

Figure 1:
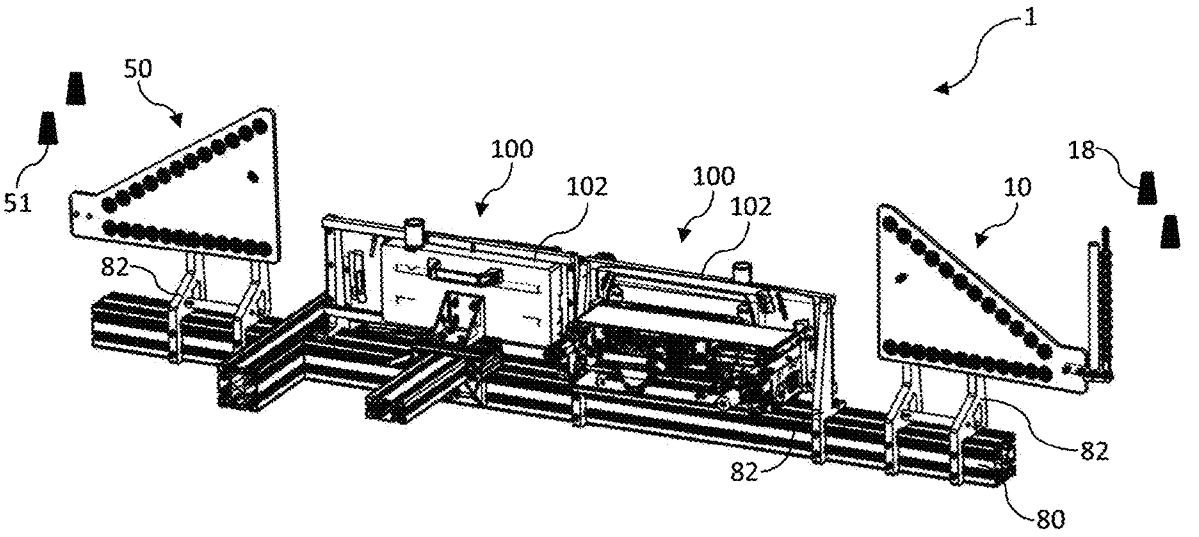
FIG. 1 is a perspective view of a thread-coating system.

Referring to FIG. 1, there is shown a thread-coating system 1 for coating multiple threads with ink. The thread-coating system 1 comprises a thread gatherer 10, a thread expander 50 and thread-coating modules 100 arranged in series therebetween. These components are each fixedly mounted on a common support structure, which takes the form of an elongate support beam 80, via respective mounting brackets 82. Although two thread-coating modules 100 are shown in FIG. 1, it will be appreciated that any number of thread-coating modules (e.g. 1 to 20) may be positioned between the thread gatherer 10 and the thread expander 50.

During use, multiple threads are drawn from supply spindles 18 and arranged by the thread gatherer 10 into a “thread wall” 12—that is, a stacked arrangement of multiple threads 14 vertically spaced apart to form the thread wall 12.

Figure 2:
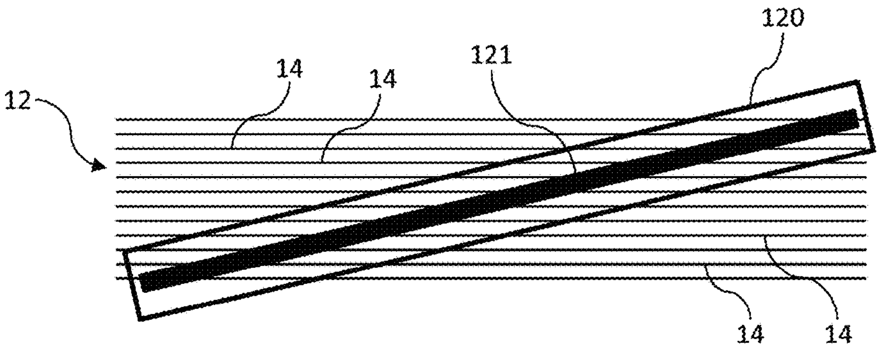
FIG. 2 is a schematic side view of a pagewide inkjet printhead oriented relative to a thread wall.

As shown schematically in FIG. 2, the thread wall 12 is fed past an inkjet printhead 120 in each thread-coating module 100 (only one inkjet printhead 120 shown in FIG. 2) so as to coat the threads 14 with ink. Typically, and as shown in FIG. 2, each printhead 120 is angled with respect to the thread wall 12 so that a row of print chips 121, having respective nozzle rows, extends from a lowermost to an uppermost thread of the thread wall 12, thereby ensuring coverage of all threads 14. Once coated by the thread-coating modules 100, the thread wall 12 is then fed into the thread expander 50, whereupon the thread wall is expanded into individual threads 14, which can be wound onto individual take-up spindles 51.

Figure 3:
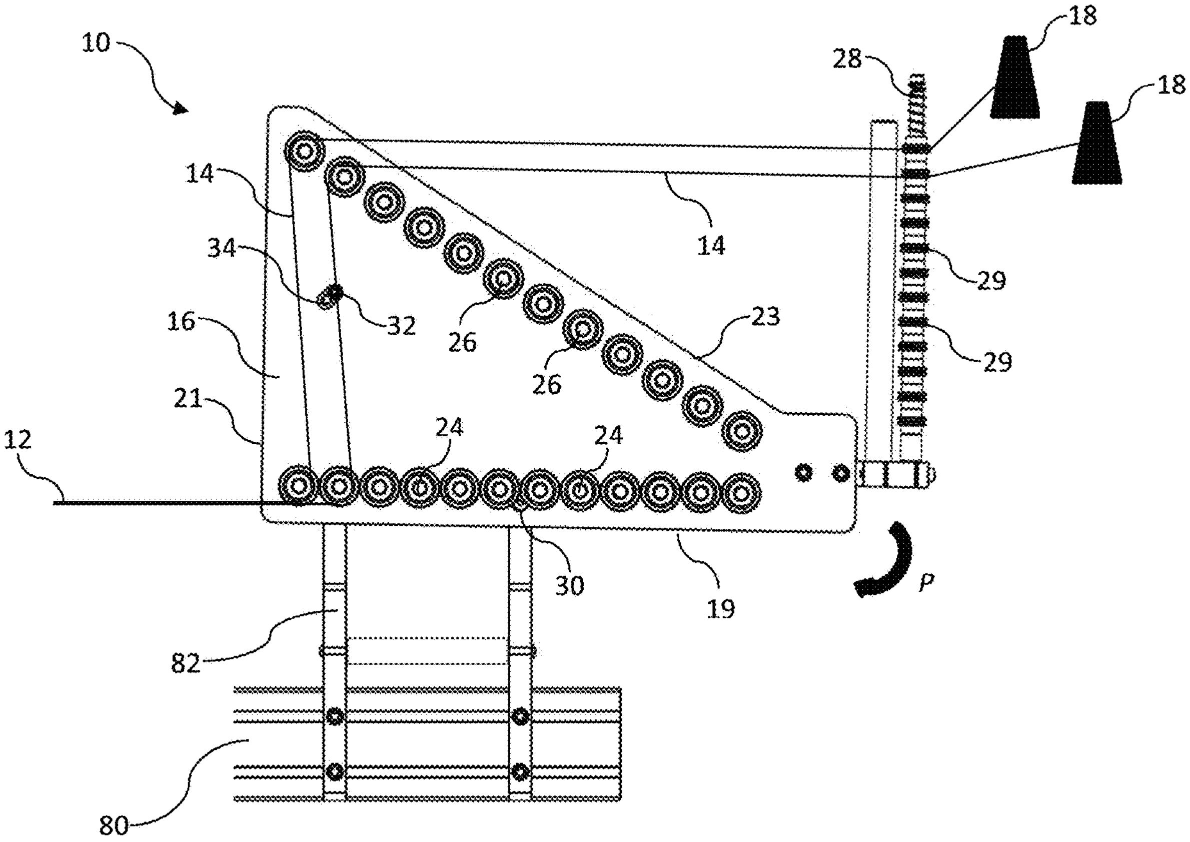
FIG. 3 is a front view of a thread-gatherer.
Figure 4:
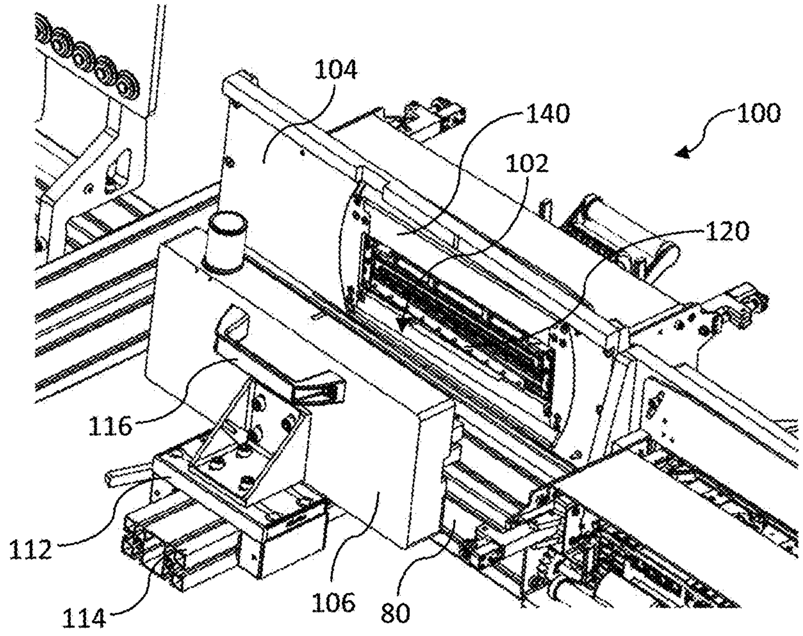
FIG. 4 is a rear perspective of a thread-coating module in an open configuration.
Figure 5:
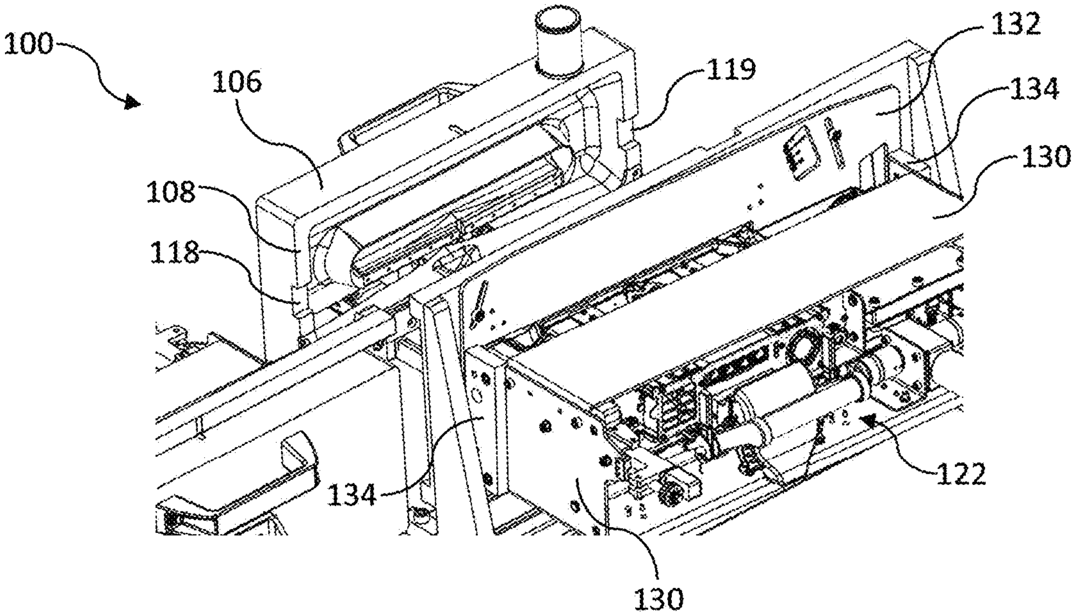
FIG. 5 is front perspective of the thread-coating module shown in FIG. 4.

Referring to FIG. 3, the thread gatherer 10 comprises a thread plate 16 configured for receiving multiple threads 14 from supply spindles 18 and gathering the threads into the thread wall 12, which is oriented in a plane parallel with the thread plate. The thread plate 16 generally takes the form of a right-angled triangle having a base 19 extending towards the thread-coating modules 100; a side edge 21 proximal the thread-coating modules 100 extending generally vertically away from the base; and an hypotenuse edge 23 tapering from an upper part of the side edge towards one end of the base distal from the thread-coating modules.

A plurality of primary rollers 24 are rotatably mounted along the base 19 of the thread plate 16 in a line extending generally towards the thread-printing modules 100. In the embodiment shown in FIG. 3, there are twelve primary rollers 24 for handling twelve threads 14, although it will be appreciated that any number of primary rollers 24 may be employed depending on the number of threads being coated. A corresponding number of secondary rollers 26 are rotatably mounted along the hypotenuse edge 23, so that each of the second rollers is positioned at a different vertical distance from a respective primary roller 24.

Individual threads 14 are fed from respective supply spindles 18 via a roller post 28 onto respective secondary rollers 26, and thence onto respective primary rollers 24. The roller post 28 is positioned distal from the thread-coating modules 100 and has a plurality of intermediary rollers 29, each having an axis of rotation perpendicular to the axes of rotation of the primary and second rollers 24 and 26. In this way, threads 14 from separate supply spindles 18 can be gathered initially onto the secondary rollers 26.

The thread wall 12 is formed by virtue of a pivot angle of the thread plate 16, which in turn angles the line of primary rollers 24 relative to a horizontal plane defined by the support beam 80. In the embodiment shown in FIG. 3, the thread plate 16 is pivoted clockwise at an angle of about 1 degree relative to the horizontal. Thus, when threads 14 exit the primary rollers 24, they are gathered into the thread wall 12 are vertically spaced apart by virtue of the angle of the line of primary rollers. By adjusting the pivot angle of the thread plate 16, it will be appreciated that a vertical spacing between threads 14 in the thread wall 12, as well as an overall height of the thread wall, may be adjusted—a larger angle provides a larger inter-thread spacing; a smaller angle provides a smaller inter-thread spacing. For the sake of clarity only two threads 14 are shown in FIG. 3, although it will be appreciated that the thread plate 16 has twelve primary rollers 24 (and twelve corresponding secondary rollers 26) for handling twelve threads, as shown schematically in FIG. 2.

The thread plate 16 is pivotally mounted about a pivot 30 and the pivot angle may be adjusted using a screw 32 received in a pivot slot 34 defined in the thread plate. Loosening the screw 32 allows pivoting movement of the thread plate 16 (as indicated by arrow P) about the pivot 30, which can then be fixed in position by re-tightening the screw.

As shown in FIG. 1, the thread expander 50 essentially mirrors the thread gatherer 10, enabling the coated thread wall 12 to be expanded into individual coated threads 14 (via primary and secondary rollers 24 and 26 of the thread plate 16) and wound onto respective take-up spindles 51.

Figure 6:
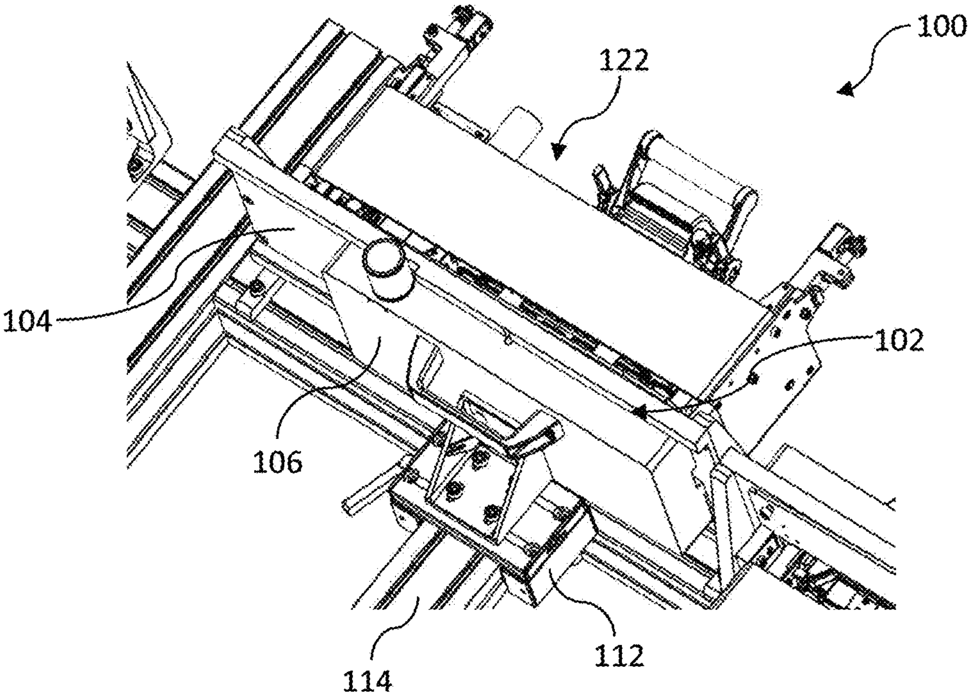
FIG. 6 is a top perspective of the thread-coating module in a closed configuration.
Figure 7:
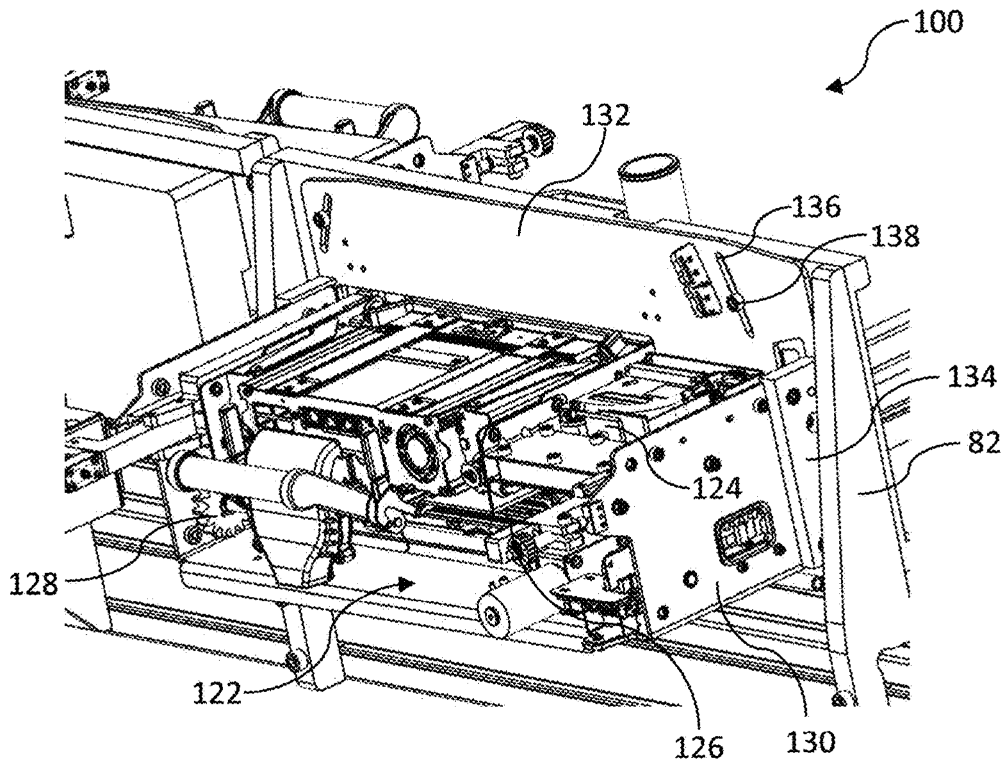
FIG. 7 a front perspective of the thread-coating module with a top part of a module chassis removed.

Referring to FIGS. 4 to 7, each thread-coating module 100 comprises a coating chamber 102, which is configurable in an open position (FIGS. 4 and 5) and a closed position (FIGS. 6 and 7). The coating chamber 102 comprises a vertically-oriented base plate 104 fixedly mounted on the support beam 80 and a chamber unit 106 slidably movable towards and away from the base plate. The chamber unit 106 has a perimeter mouth 108 opposing the base plate 104, such that the mouth engages with the base plate in the closed position. The chamber unit 106 is mounted on a slide bracket 112, which is slidably movable along a fixed slide 114 extending perpendicularly away from the support beam 80. A handle 116 is fastened to a rear face of the chamber unit 106 for conveniently sliding the chamber unit towards and away from the base plate 104. In the closed position, the coating chamber 102 is configured for coating ink onto the thread wall 12; in the open position the coating chamber 102 is configured for maintenance, cleaning and positioning the thread wall 12 between a thread entrance 118 and a thread exit 119 defined at opposite ends of the chamber unit 106.

An inkjet printhead 120 is received in a printhead opening of the base plate 104 for ejecting ink droplets in a generally horizontal direction into the coating chamber 102. Each of the two thread-coating modules 100 is oppositely oriented with respective to the thread wall 12 to enable coating of threads 14 from opposite sides.

The printhead 120 is a replaceable component of an integrated inkjet print module 122 of the type described in U.S. Pat. No. 10,647,137, the contents of which are incorporated herein by reference. As best seen in FIG. 7, the print module 122 is an integrated unit incorporating a printhead wiper 124 and a printhead capper 126, as well as a printhead movement mechanism 128 for moving the printhead 120 between a coating position in which the printhead is extended towards the coating chamber 102 and a maintenance position in which the printhead is retracted away from the coating chamber. In the maintenance position, the printhead 120 may be capped using the movable printhead capper 126 or wiped using the movable printhead wiper 124, as described in detail in U.S. Pat. No. 10,647,317.

The inkjet print module 122 has an external module chassis 130, which is fastened to a front pivot plate 132 via plate brackets 134. The pivot plate 132 faces the base plate 104, extending in a plane parallel therewith. The pivot plate 132 is pivotable relative to the base plate 104 by means of printhead pivot slots 136 defined in the pivot plate, each having a respective fastening screw 138 for securing the pivot plate to the base plate in a desired orientation. In this way, the angular orientation of the printhead 120 can be adjusted relative to the base plate 104 (and relative to the thread wall 12), such that uppermost and lowermost threads 14 of the thread wall overlap, in a droplet direction, with the printhead (see FIG. 2). From FIG. 4, it can be seen that the pivot plate 132 includes a shroud 140 which surrounds the printhead 120 and extends into the printhead slot of the base plate 104 so as to be flush with the base plate.

Figure 8:
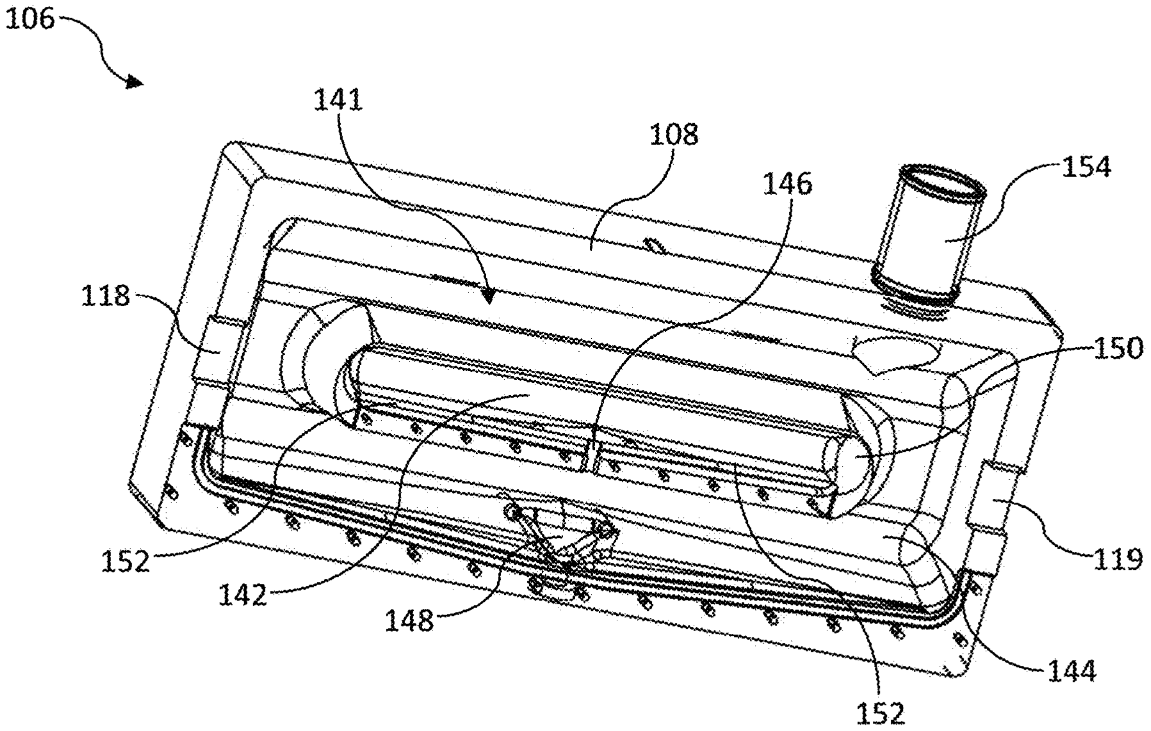
FIG. 8 is a front perspective of a chamber unit.

Referring to FIG. 8, the chamber unit 106 takes the form of an open elongate chamber having the perimeter mouth 108, which defines the thread entrance 118 and the thread exit 119 and opposite ends of the chamber unit. The chamber unit 106 incorporates an ink management system 141, which is positioned opposite the printhead 120 when the coating chamber is in its closed position. The ink management system 141 comprises an ink-collection slot 142 and an aerosol-collection chamber 144 surrounding the ink-collection slot. In use, the ink management system recycles larger ink droplets via the ink-collection slot 142 opposite the printhead 120 and extracts smaller stray ink droplets ("ink aerosol") via the aerosol-collection chamber 144.

The ink-collection slot takes 142 the form of an open elongate chamber substantially coextensive with the printhead 120 and defines a lower drain aperture 146 aligned with a drain port defined in a floor of the chamber unit 106, such that ink collected in the ink-collection slot drips into the drain port 148 under gravity. From the drain port 148, ink may be recycled to an ink reservoir (not shown) and supplied back to the printhead 120 via a suitable ink delivery system (not shown). Inner walls 150 of the ink-collection slot are contoured for directing captured ink towards the drain aperture 146. Likewise, ink-collection channels 152 at either side of the drain aperture 146 are tapered towards the drain aperture for maximizing ink collection.

A vacuum port 154 is positioned in a roof of the chamber unit 106 for extracting a majority of stray ink aerosol from the aerosol-collection chamber 144. The vacuum port 154 may be connected to a suitable sump (not shown) for disposal of ink. Additionally, the drain port 148 may receive ink droplets from the aerosol-collection chamber 144 for recycling. Accordingly, the chamber unit 106 is configured for minimal wastage of any excess ink which does not coat the thread wall 12.

In order to coat threads with ink, the individual threads 14 are first threaded through the thread-coating system 1. Threads 14 from supply spindles 18 are gathered into a thread wall 12 via the thread gatherer 10 and the thread wall is threaded through the coating chambers 102 of the thread-coating modules 100. The coating chambers 102 are opened to facilitate threading and printhead adjustments. Each thread 14 is then wound onto a respective take-up spindle 51 from the thread expander 50.

With the thread-coating system 1 threaded, a pivot angle of the thread plate 16 is adjusted to determine a height of the thread wall 12 and a gap between threads 14. (For example, thicker threads will require a larger gap than finer threads). With the pivot angle of the thread plate 16 set, a pivot angle of each printhead 120 is adjusted using the pivot plate 132 to ensure that all threads in the thread wall 12 overlap with each printhead. Typically, endmost print chips of the printheads 120 are positioned for ejecting ink onto uppermost and lowermost threads 14 in the thread wall 12. Once all necessary adjustments have been made, the coating chambers 102 are closed for coating.

In order to coat the threads, a winding mechanism (not shown) operatively connected to the take-up spindles 51 is actuated to draw the thread wall 12 through the thread-coating modules 100 from the supply spindles 18. Actuation of the printheads 120 ejects ink into the coating chambers 102 and coats the thread wall 12 from either side. Excess ink is captured by the ink-collection slot 142 and recycled via the drain port 148 back to an ink delivery system supplying ink to the printheads. Stray ink aerosol is extracted via the aerosol-collection chamber 144 and vacuum port 154 for disposal.

From the foregoing, it will be appreciated that pagewide digital inkjet printing technology is continuously expanding into new markets and can potentially revolutionize traditional thread coloring processes by improving speed, versatility and efficiency, as well as lowering costs and reducing ink and water wastage.

It will, of course, be appreciated that the present invention has been described by way of example only and that modifications of detail may be made within the scope of the invention, which is defined in the accompanying claims.

The invention claimed is:

1. A thread-coating module comprising:

a coating chamber having a thread entrance at one end, a thread exit at an opposite end thereof, a base plate having a printhead opening and a chamber unit having a mouth for engagement with the base plate; and an inkjet printhead received in the printhead opening of the coating chamber for ejecting ink onto thread fed through the coating chamber; and wherein the chamber unit and the base plate are movable relative to each other for opening and closing the coating chamber, and wherein the chamber unit comprises an ink management system positioned opposite the printhead for managing excess ink, the ink management system comprising:

an inner ink-collection slot in fluid communication with a drain port for recycling excess ink; and an outer aerosol-collection chamber fluidically connected to a vacuum port.

2. The thread-coating module of claim 1, wherein the outer aerosol-collection chamber surrounds the inner ink-collection slot.

3. The thread-coating module of claim 1, wherein the outer aerosol-collection chamber is in fluid communication with the drain port.

4. The thread-coating module of claim 1, wherein the vacuum port is defined in a roof of the coating chamber.

5. The thread-coating module of claim 1, wherein the drain port is defined in a floor of the coating chamber.

6. The thread-coating module of claim 4, wherein the inner ink-collection slot has a lower drain aperture defined in a base thereof.

7. The thread-coating module of claim 6, wherein the drain port is positioned for receiving ink from the drain aperture under gravity.

8. The thread-coating module of claim 6, wherein inner walls of the inner ink-collection slot are configured for directing captured ink towards the drain aperture.

9. The thread-coating module of claim 8, wherein the inner ink-collection slot comprises one or more ink-collection channels tapered towards the drain aperture.

10. The thread-coating module of claim 1, wherein the inner ink-collection slot is configured as an open chamber substantially coextensive with the printhead.

11. The thread-coating module of claim 1, wherein the base plate is fixedly mounted on a support structure and the chamber unit is slidably movable towards and away from the base plate.

12. The thread-coating module of claim 1, wherein the printhead is fast with a pivot plate, the pivot plate being pivotally movable relative to the base plate about a pivot axis perpendicular to a plane of the base plate for adjusting an angle of the printhead relative to the base plate.

13. The thread-coating module of claim 12, wherein at least part of the pivot plate is received in the printhead opening of the base plate.

* * * * *